United States Patent
Sawada et al.

(10) Patent No.: US 8,219,278 B2
(45) Date of Patent: Jul. 10, 2012

(54) NOX SENSOR MALFUNCTION DIAGNOSTIC DEVICE AND MALFUNCTION DIAGNOSTIC METHOD

(75) Inventors: Hiroshi Sawada, Gotenba (JP); Shinichiro Imamura, Chiryu (JP)

(73) Assignees: Toyota Jidosha Kabushiki Kaisha, Aichi-Ken (JP); Denso Corporation, Aichi-Pref (JP)

(*) Notice: Subject to any disclaimer, the term of this patent is extended or adjusted under 35 U.S.C. 154(b) by 196 days.

(21) Appl. No.: 12/673,358

(22) PCT Filed: Aug. 11, 2008

(86) PCT No.: PCT/IB2008/002112
§ 371 (c)(1),
(2), (4) Date: Feb. 12, 2010

(87) PCT Pub. No.: WO2009/022217
PCT Pub. Date: Feb. 19, 2009

(65) Prior Publication Data
US 2011/0202230 A1    Aug. 18, 2011

(30) Foreign Application Priority Data
Aug. 13, 2007    (JP) ................... 2007-210981

(51) Int. Cl.
*G01M 17/00* (2006.01)
*G06F 7/00* (2006.01)
*G06F 19/00* (2011.01)

(52) U.S. Cl. ................................... 701/30.3
(58) Field of Classification Search ............... 701/29, 701/31, 34, 103
See application file for complete search history.

(56) References Cited

U.S. PATENT DOCUMENTS

| 6,453,663 B1 * | 9/2002 | Orzel et al. ........... 60/277 |
| 6,588,251 B2 * | 7/2003 | Zhang et al. ......... 73/23.32 |
| 6,843,240 B1 * | 1/2005 | Hahn et al. ........... 123/688 |

FOREIGN PATENT DOCUMENTS

| DE | 198 28 929 A1 | 1/2000 |
| DE | 199 45 374 A1 | 3/2001 |
| DE | 100 49 685 A1 | 4/2002 |
| DE | 100 62 289 A1 | 7/2002 |
| DE | 103 26 932 A1 | 1/2005 |
| JP | 2003-120399 A | 4/2003 |
| JP | 2004-225640 A | 8/2004 |
| WO | 2006/081598 A2 | 8/2006 |

* cited by examiner

*Primary Examiner* — Mary Cheung
*Assistant Examiner* — Kyle K Tsui
(74) *Attorney, Agent, or Firm* — Sughrue Mion, PLLC (57) ABSTRACT

The NOx sensor malfunction diagnostic device includes a control section. The control section performs the supplying of an excess amount of reducing agent, which is more than an amount required to reduce adsorbed NOx in a NOx reduction catalyst when a predetermined amount of NOx has been adsorbed in the NOx catalyst, and detects malfunctions of the NOx sensor based on NOx sensor output signal when the excess amount of reduction agent is supplied.

9 Claims, 5 Drawing Sheets

NOX SENSOR MALFUNCTION DIAGNOSTIC DEVICE AND MALFUNCTION DIAGNOSTIC METHOD

BACKGROUND OF THE INVENTION

1. Field of the Invention

The present invention relates to an malfunction diagnostic device and an malfunction diagnostic method for NOx sensors, and in particular, relates to a device and a method of malfunction diagnosis for NOx sensors disposed downstream of a NOx storage reduction catalyst.

2. Description of the Related Art

In general, a NOx catalyst that purifies NOx (nitrogen oxides) contained in the exhaust gas is provided in the exhaust gas purification system of the exhaust system of an internal combustion engine such as a diesel engine and a lean-burn gasoline engine. Several types of NOx catalysts are known; however, among these, the NOx storage reduction catalyst (NSR: NOx Storage Reduction) that adsorbs and remove NOx present in the exhaust gas is well known. The NOx storage reduction catalyst adsrobs NOx in the exhaust gas when the air-fuel ratio of the exhaust gas supplied thereto is leaner (when an excess amount of oxygen is present in the atmosphere) than a predetermined value (theoretical air-fuel ratio, in typical), and releases the stored-NOx and reduces it to $N_2$ when the air-fuel ratio of the exhaust gas supplied thereto is richer (when an insufficient amount of oxygen is present in the atmosphere) than the predetermined value. In other words, the NOx storage reduction catalyst has a storage and release function.

Once the NOx storage reduction catalyst stores NOx to a saturation (full) state, the NOx catalyst cannot store NOx any more. For this reason, reducing agents are supplied to the NOx catalyst at appropriate time intervals to place it in the atmosphere where oxygen is insufficient. Stored-NOx is then released from the NOx catalyst to regain a NOx storage capability of the NOx catalyst. This action is called NOx catalyst regeneration.

For example, to determine the timing of start and end of this NOx catalyst regeneration, the NOx sensor that detects the NOx concentration in the exhaust gas is disposed at the downstream side of the NOx catalyst. For example, when the NOx catalyst stores NOx to the full state, NOx leaks into the catalyst downstream side. So, NOx catalyst regeneration may be started when the NOx sensor detects this NOx leakage, for example. When the NOx concentration detected by the NOx sensor is lowered enough during NOx catalyst regeneration, it may be considered that stored-NOx is all released. In this case, NOx catalyst regeneration may be ended.

Here, for engines equipped in automobiles, abnormality detection of catalysts or sensors while mounted in a vehicle (in the on-board state) is required by regulations of various nations in order to prevent automobiles from driving with a bad exhaust gas condition. There exist already relatively many techniques for malfunction detection of catalyst. However, there is no effective technique for malfunction detection of the NOx sensor disposed at the downstream side of the NOx catalyst. Especially now when emission control is getting more severe, requirement expands not simply to the failure detection of a broken wire or the like but also to the accurate detection of rationality of sensor output in relation to deterioration. Therefore, a drastic countermeasure is necessary to satisfy this requirement.

To diagnose malfunctions of for the NOx sensor, for example, a plurality of NOx sensors are disposed and the detected NOx concentrations are compared relatively, or NOx sensors are removed and tested by a stationary type analyzer, may be considered. However, the former method requires high cost, and the latter method cannot perform diagnosis on board.

An malfunction detection device for the NOx sensor that is disposed at the downstream side of the NOx absorbent is disclosed in Japanese Patent Application Publication No. 2003-120399 (JP-A-2003-120399). If NOx concentration in the exhaust gas that reaches the NOx sensor is compulsory changed, and if the change of the NOx sensor output value is deviated from the change of normal sensor operation, malfunction of the NOx sensor is determined.

However, the exhaust gas that reaches the NOx sensor is the exhaust gas that has passed through NOx absorbent. Therefore, the NOx concentration of the exhaust gas is the concentration of NOx in which NOx has been absorbed by the NOx absorbent. In other words, the output value of the NOx sensor reflects the influence of the NOx absorbent that is located in front of the sensor. It causes decreasing accuracy of malfunction diagnosis of the NOx sensor.

SUMMARY OF THE INVENTION

The present invention provides a NOx sensor malfunction diagnostic device and malfunction diagnostic method, that diagnoses malfunctions of the NOx sensor disposed downstream of the NOx storage reduction catalyst.

The first aspect of the present invention is directed to a device that diagnoses malfunction of the NOx sensor in the internal combustion engine in which the NOx storage reduction catalyst is disposed in the exhaust passage and the NOx sensor is provided downstream of NOx storage reduction catalyst. The NOx sensor malfunction diagnostic device has a control section that performs the supplying the NOx catalyst with an excess amount of reducing agent, which is more than the amount required to reduce the predetermined amount of stored-NOx when the NOx catalyst has adsorbed the predetermined amount of NOx, and that diagnoses malfunctions of the NOx sensor based on output of the NOx sensor when the excess amount of reducing agent is supplied.

When an excess amount of reducing agent, which is more than the amount required to reduce the stored-NOx, is supplied to the NOx catalyst, the NOx sensor issues output caused by the excess reducing agents that are not used for release and reduction of the stored-NOx. If the amount of excess reducing agent is known, malfunctions of the NOx sensor may be diagnosed based on the output of the NOx sensor in response to the excess reducing agents. Malfunctions of the NOx sensor are diagnosed based on the NOx sensor output in relation to the known excess amount of reducing agent that remains after the NOx catalyst has released all the adsorbed NOx. Therefore, malfunction diagnostic of the NOx sensor may be executed without the influence of deterioration and the like of the NOx catalyst. For this reason, preferable and highly precise malfunction diagnosis may be executed. Furthermore it is possible to distinguish malfunctions of the NOx sensor from malfunctions of the NOx catalyst.

In the first aspect, the control section may supply the excess amount of reducing agent through a single rich spike.

Or, in the first aspect, the control section may supply the excess amount of reducing agent through a double rich spike.

In the aspect described above, malfunctions of the NOx sensor may be diagnosed based on the NOx sensor output during the second spike of the double rich spike.

In the aspect described above, the control section may perform a plurality of double rich spikes while gradually increasing the amount of reducing agent in the first spike and maintaining the amount of the reducing agent of the second spike at a constant amount. If the double rich spike is performed a plurality of times, malfunction of the NOx sensor may be diagnosed based on the NOx sensor output behavior during the second spike of the present time, at the time when the NOx sensor output behavior during the second spike is equal between the present time and the previous time.

In the aspect described above, the NOx sensor may detect NOx and ammonia in the exhaust gas.

The second aspect of the present invention is a method of diagnosing malfunction of the NOx sensor in the internal combustion engine in which the NOx storage reduction catalyst is disposed in the exhaust passage and the NOx sensor is provided downstream of NOx storage reduction catalyst. In the malfunction diagnostic method of the NOx sensor, an excess amount of reducing agent, which is more than the amount required to reduce the predetermined amount of NOx, is supplied to the NOx catalyst when it is determined that the amount of stored NOx has reached the predetermined amount; and malfunction of the NOx sensor is diagnosed based on the NOx sensor output signal when the excess amount of reducing agents are supplied.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Description is hereinafter made for carrying out the invention with reference to the drawings.

Figure 1:
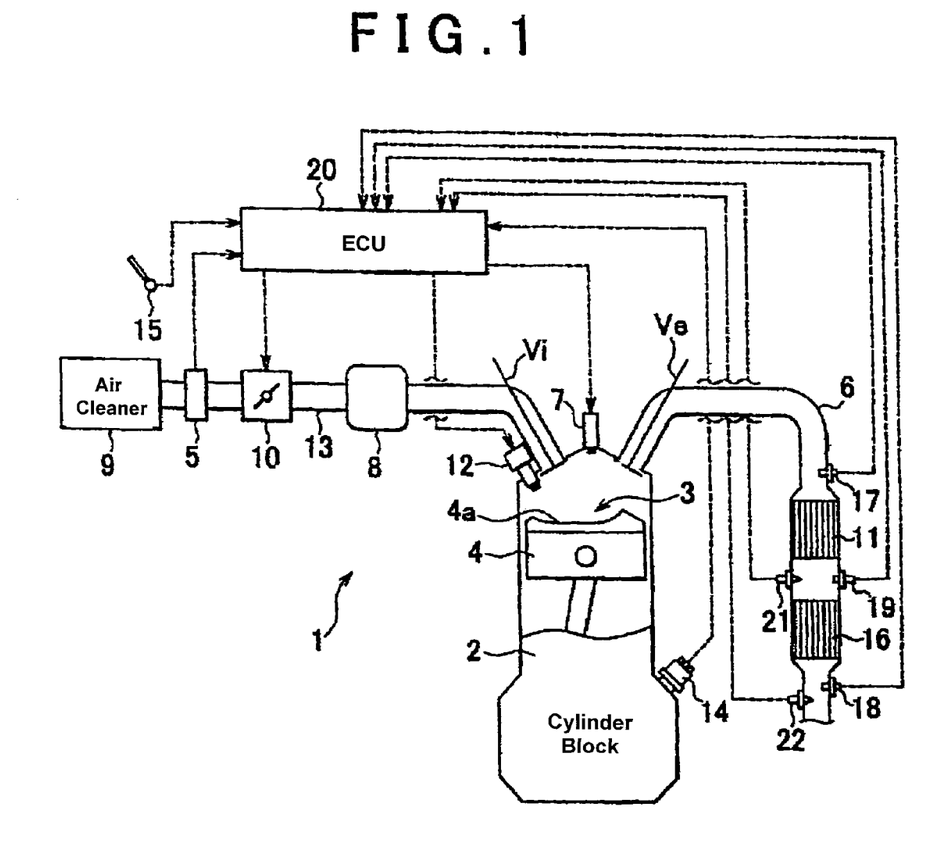
FIG. 1 is a schematic system diagram of an internal combustion engine according to an embodiment of the present invention.

FIG. 1 is a schematic system diagram depicting an internal combustion engine according to an embodiment of the present invention. The internal combustion engine 1 shown in the drawing burns a mixture of fuel and air in a combustion chamber 3 formed in a cylinder block 2, and generates power by reciprocating a piston 4 in the combustion chamber 3. The internal combustion engine 1 is a multi-cylindrical engine for vehicles (only a single cylinder is shown), which is a spark ignition type internal combustion engine, in particular, a gasoline engine. However, the internal combustion engine in the scope of the present invention is not limited to the spark ignition type internal combustion engine. It may be a compression ignition type internal combustion engine or a diesel engine.

To a cylinder head of the internal combustion engine 1, an intake valve Vi that opens and closes an intake port, and an exhaust valve Ve that opens and closes an exhaust port are arranged in each cylinder. Each intake valve Vi and each exhaust valve Ve are opened/closed by a camshaft (not shown). At the top of the cylinder head, an ignition plug 7 that ignites a mixture in the combustion chamber 3 is disposed in each cylinder. Furthermore, an injector (fuel injection valve) 12 is arranged in the cylinder head in each cylinder to inject fuel directly into the combustion chamber 3. A top portion of the piston 4 is constituted in the shape of a bowl, and a concave portion 4a is formed on its top surface. In the internal combustion engine 1, air is drawn in the combustion chamber 3, and fuel is directly injected toward the concave portion 4a of the piston 4 from the injector 12. By this, a layer of a mixture of fuel and air is formed (stratified) in the vicinity of the ignition plug 7, and stable stratified combustion is conducted.

The intake port of each cylinder is connected to a surge tank 8, which is an intake-collecting chamber, through a manifold for cylinders. An intake pipe 13, which forms an intake-collecting passage, is connected to the upstream side of the surge tank 8. An air cleaner 9 is disposed at the upstream end of the intake pipe 13. An air flow meter 5, which detects an in take air amount, and an electronically controlled throttle valve 10 are mounted on the intake pipe 13 from the upstream side in this order. An intake passage is formed by the intake port, surge tank 8, and intake pipe 13.

The exhaust port of each cylinder is connected to the exhaust pipe 6, which forms an exhaust-collecting passage, through a manifold for cylinders. These exhaust port, branch pipe, and exhaust pipe 6 form the exhaust passage. The exhaust pipe 6 is provided with a three-way catalyst 11 that can concurrently purify CO, HC, and NOx in the exhaust gas in its upstream side, and the NOx catalyst 16 that can purify NOx in the exhaust gas in its downstream side. In this embodiment, a CCL catalyst unit (CCL: Catalytic Converter Lean), in which the three-way catalyst 11 and the NOx catalyst 16 are housed in the same casing, is used. However, the three-way catalyst 11 and the NOx catalyst 16 may be housed in a separate casing and arranged individually. In the case of the diesel engine, an oxidation catalyst and a particulate filter are typically provided instead of the three-way catalyst.

An air fuel ratio sensor 17 that detects an air-fuel ratio (A/F) of the exhaust gas is disposed upstream of the three-way catalyst 11. The air-fuel ratio sensor 17 is formed by a so-called wide area air fuel ratio sensor. The air fuel ratio sensor 17 continuously detects the air-fuel ratio across the relatively wide range, and outputs a signal that is proportional to the air-fuel ratio. Alternatively, the air-fuel ratio sensor 17 may be formed by a so-called $O_2$ sensor, in which an output value increases when the air fuel ratio is equal to or exceeds the theoretical air fuel ratio (stoichiometric ratio).

A second air-fuel ratio sensor 19 is disposed between the three-way catalyst 11 and the NOx catalyst 16. An $O_2$ sensor may be used as the second air-fuel ratio sensor 19; however, a wide area air-fuel ratio sensor may also be used.

An NOx sensor 18 that detects NOx concentration of the exhaust gas is provided downstream of the NOx catalyst 16. The NOx sensor 18 outputs an electric current that is proportional to the concentration of NOx in the exhaust gas. Specifically, the NOx sensor 18 is a so-called limiting current type NOx sensor, which can detect not only NOx in the exhaust gas but also ammonia ($NH_3$) in the exhaust gas. The NOx sensor 18 decomposes NOx (NO in particular) in the exhaust gas into $N_2$ and $O_2$ within the sensor, and generates an electric current output that is proportional to an oxygen ion amount, by inter electrode transfer of oxygen ion based on the decomposed $O_2$. Furthermore, the NOx sensor 18 decomposes $NH_3$ in the exhaust gas to NO and $H_2O$ within the sensor, and further decomposes the NO to $N_2$ and $O_2$, and generates an electric current output by the same principle as the case of NOx. The NOx sensor 18 generates output that is proportional to the total concentration of NOx concentration and ammonia concentration. The NOx sensor 18 cannot separately generate output of NOx concentration and ammonia concentration.

The ignition plug 7, throttle valve 10, injector 12, and the like are electrically connected to an electronic control unit (hereinafter referred to as ECU) 20 functioning as control section. The ECU 20 includes the CPU, ROM, RAM, input/output port, storage device, and the like, none of which is shown. As shown in the drawing, to the ECU 20, the air flow meter 5, the air-fuel ratio sensor 17, the second air-fuel ratio sensor 19, the NOx sensor 18, in addition to these, a crank angle sensor 14 that detects a crank angle of the internal combustion engine 1, an accelerator operation amount sensor 15 that detects an accelerator operation amount, exhaust temperature sensors or upstream exhaust temperature sensor 21 and downstream exhaust temperature sensor 22 that are respectively disposed at the respective upstream side or downstream side of the NOx catalyst 16, and other various sensors are electrically connected through an A/D converter or the like. In order to attain desired output, the ECU 20 controls the ignition plug 7, the throttle valve 10, the injector 12, and the like, to control ignition timing, a fuel injection amount, the fuel injection timing, the throttle opening, and the like, based on the detected values of various sensors. The upstream exhaust temperature sensor 21 is disposed between the three-way catalyst 11 and the NOx catalyst 16. The NOx sensor 18 includes a heater. Temperature control (heater control) of the NOx sensor 18 is executed by the ECU 20. Output of the crank angle sensor 14 is used for detecting the engine speed Ne.

The three-way catalyst 11 purifies CO, HC, and NOx simultaneously when the air-fuel ratio of the exhaust gas flowing into the three-way catalyst 11 is about the theoretical air-fuel ratio (stoichiometric ratio, A/F=14.6 for example). The range of the air-fuel ratio that at which all three substances may be purified simultaneously and with high efficiency is narrow. Therefore, for the three-way catalyst 11 to function efficiently, the intake air-fuel ratio is controlled so that the air-fuel ratio of the exhaust gas flowing to the three-way catalyst 11 approximates the theoretical air-fuel ratio. This is called a stoichiometric control. The operation of the engine during the stoichiometric control is called "stoichiometric operation". In the stoichiometric control, the target air-fuel ratio is set equal to the theoretical air-fuel ratio, and, not only a fuel injection amount injected from the injector 12 but also the air-fuel ratio are feedback-controlled so that the air-fuel ratio detected by the air-fuel ratio sensor 17 reaches the target air-fuel ratio.

In view of reduction in the fuel economy, the target air-fuel ratio may be set higher than the theoretical air-fuel ratio, that is, set to a lean value. This is called a lean burn control. The operation of the engine during the lean burn control is called "lean burn operation". In the lean burn control, not only the fuel injection amount but also the air-fuel ratio are feed-back-controlled as in the stoichiometric control so that the air-fuel ratio detected by the air-fuel ratio sensor 17 reaches the target air fuel ratio. During the lean burn control, a large amount of NOx is discharged from the engine, and at the same time a controlled air-fuel ratio is usually brought to a lean value, at which the NOx purification rate in the three-way catalyst 11 is extremely lowered. In this case, in order to purify NOx that passes through the three-way catalyst 11, the NOx catalyst 16 is disposed at the downstream side of the three-way catalyst 11.

An NOx storage reduction catalyst (NSR: NOx Storage Reduction) is used as the NOx catalyst 16. The NOx storage reduction catalyst is constituted by noble metal such as platinum Pt as a catalyst component and by an NOx absorbing component, both components are supported on the base material surface formed of an oxide such as alumina $Al_2O_3$. The NOx absorbing component may be formed of, for example, alkali metals, alkali earth metals, and rare earth metals. Alkali metals may be preferably potassium K, sodium Na, lithium Li, and Cesium Cs. Alkali earth metals may be preferably barium Ba and calcium Ca. Rare earth metals may be preferably lanthanum La and yttrium Y.

The NOx storage reduction catalyst 16 adsorbs NOx in the exhaust gas in the form of nitrate when the air-fuel ratio of the exhaust gas flowing through the NOx storage reduction catalyst 16 is leaner than the theoretical air-fuel ratio, and releases stored-NOx when the air-fuel ratio of the exhaust gas flown is equal to or richer than the theoretical air-fuel ratio. During the lean burn operation, the exhaust air-fuel ratio is leaner than the theoretical air-fuel ratio, and thus the NOx catalyst 16 absorbs the NOx in the exhaust gas. When the NOx catalyst 16 becomes saturated, the NOx catalyst 16 cannot adsorb any more NOx. Therefore, rich spike or rich spike control is executed to temporarily decrease the air-fuel ratio of the exhaust gas to at least the theoretical air-fuel ratio, so that the adsorbed NOx is reduced. In the rich spike control, the target air-fuel ratio is temporarily set at the theoretical air-fuel ratio or richer value, and the air-fuel ratio of the mixture and then the exhaust gas are controlled to the theoretical air-fuel ratio or the rich value lower than the theoretical ratio. Reducing components (HC, CO, $H_2$) included in this rich exhaust gas function as reducing agents to release the stored-NOx from the NOx catalyst, and to reduce and purify the released-NOx. The stored-NOx is released from the NOx catalyst 16, and the NOx storage capacity of the NOx catalyst 16 is recovered in this way, which is called NOx catalyst regeneration.

There are various other methods with respect to the rich spike control. For example, a separate reducing agent supply valve may be disposed upstream of the NOx catalyst, and the reducing agent supply valve is controlled to supply reducing agents to the exhaust gas. Reducing agents may function as long as they generate reducing components such as hydrocarbon HC or carbon monoxide CO in the exhaust gas. Reducing agents of this type include: gases such as hydrogen or carbon monoxide; hydrocarbons in the form of liquid or gas such as propane, propylene, or butane; or liquid fuel such as gasoline, light oil, or coal oil. Gasoline, which is fuel for engine, is preferably used. Alternatively, fuel may be injected from the injector 12 to the combustion chamber 3 in the late period of the expansion stroke or in the exhaust stroke to add unburned fuel in the exhaust gas (i.e., "post injection").

If the reducing agents are supplied to the NOx catalyst 16 through the rich spike, reducing components and nitrogen $N_2$ in the exhaust gas react in the NOx catalyst 16 to form ammonia $NH_3$. The ammonia $NH_3$ reacts with NOx separated from the NOx catalyst 16 to form $N_2$, as a result of reduction of NOx. When excess reducing agent is supplied, all of the NOx adsorbed by the NOx catalyst 16 is reduced. In addition to this, ammonia $NH_3$ is formed from the excess reducing component that has not been consumed in the reduction of NOx, and is discharged to the downstream side from the NOx catalyst 16. The discharged ammonia $NH_3$ is detected by the NOx sensor 18.

The NOx catalyst 16 will have difficulty adsorbing and reducing NOx if the temperature of the NOx catalyst 16 is not within a predetermined temperature range (for example, 280 to 550° C.). In this embodiment, the temperature of the NOx catalyst 16 (temperature of catalyst bed) is detected or estimated to determine whether lean burn operation may be executed. The temperature of the NOx catalyst 16 may be detected directly by a temperature sensor embedded in the NOx catalyst; however, in this embodiment, the temperature is estimated. Specifically, the ECU 20 estimates the catalyst temperature based on the upstream exhaust temperature and the downstream exhaust temperature as detected by the upstream exhaust temperature sensor 21 and the downstream exhaust temperature sensor 22, respectively. Estimation methods are not limited to these examples.

The process of diagnosing a malfunction of the NOx sensor is described below.

In general, the malfunction diagnostic process of the NOx sensor 18 in the present embodiment is characterized in that, when a predetermined amount of NOx is stored in the NOx catalyst 16, an excess amount of reducing agent, which is more than the amount required to reduce the adsorbed NOx (referred to as "required amount" hereinafter), is supplied to the NOx catalyst 16, and malfunction of the NOx sensor 18 is determined based on the output of the NOx sensor 18 at this time.

When an excess amount of reducing agent is supplied to the NOx catalyst 16, ammonia is formed by a residual amount of reducing agent that has not been used to reduce the adsorbed NOx. The ammonia is detected by the NOx sensor 18. The amount of adsorbed NOx is determined in advance, so the amount of reduction agent required to reduce the adsorbed NOx is determined empirically. Therefore, if a predetermined amount of reducing agent is supplied to the NOx catalyst in addition to the required amount, the NOx sensor 18 indicates that an excess amount of reducing agent has been supplied. Therefore, monitoring output of the NOx sensor 18 makes it possible to diagnose malfunctions of the NOx sensor 18.

The first embodiment of NOx sensor malfunction diagnostic process will be described next with reference to FIGS. 2A-2C. As a precondition, the NOx catalyst is not deteriorated and capable of storing a sufficient amount of NOx.

Figure 2A:
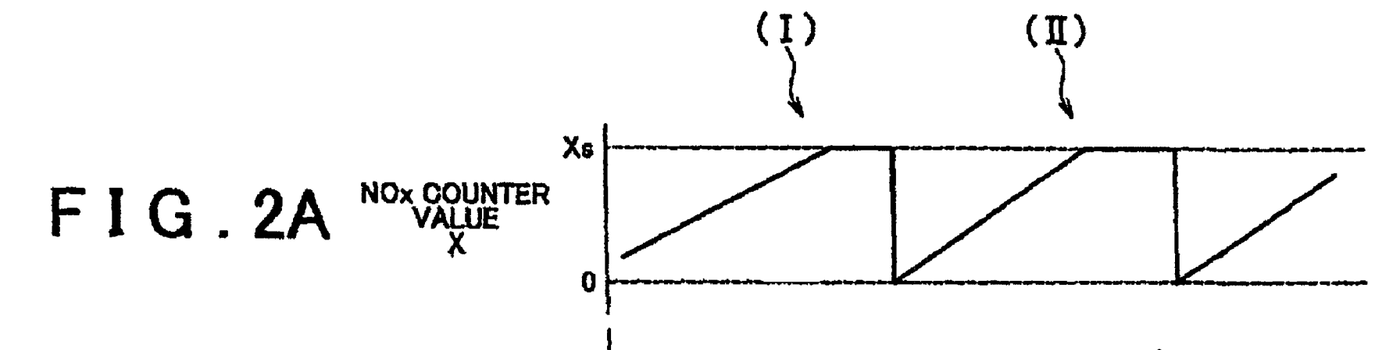
FIG. 2 is a time chart of the first aspect of malfunction diagnostic method.

In the drawing, FIG. 2A shows the NOx counter value X that is an integrated amount of NOx stored in the NOx catalyst 16. The NOx counter is equipped in the ECU 20. Specifically, the ECU 20 estimates an amount of NOx discharged from the engine according to the map (or function) that is experimentally obtained in advance, based on the detected parameters of the engine operation state. The ECU 20 integrates the discharged NOx amount at each predetermined time period and sets the accumulated NOx amount as the amount of NOx currently adsorbed by the NOx catalyst 16. As a parameter of this type, it is preferable to use at least one of the engine speed Ne, the intake air amount Ga, the upstream air-fuel ratio A/Ffr detected by the air-fuel ratio sensor 17, the exhaust temperature Tefr detected by the upstream exhaust temperature sensor 21, and the fuel injection amount Q. More preferably, a load factor (=Ga/Ne) obtained from the engine speed Ne and the intake air amount Ga, and the upstream air-fuel ratio A/Ffr detected by the air-fuel ratio sensor 17, are used.

Figure 2B:
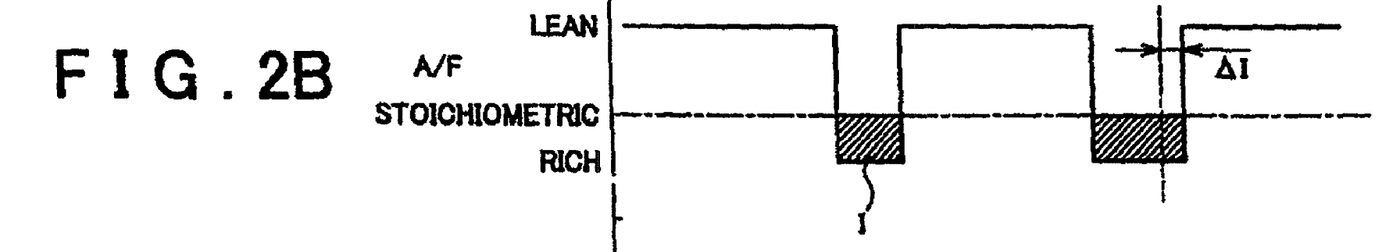

FIG. 2B shows the air-fuel ratio A/F of the exhaust gas supplied to the NOx catalyst 16. The exhaust gas air-fuel ratio A/F is generally equal to the upstream air-fuel ratio A/Ffr detected by the air-fuel sensor 17. FIG. 2C shows the output of the NOx sensor 18. Specifically, FIG. 2C shows the ammonia concentration detected by the NOx sensor 18.

First, the case of the reference symbol (I) on the left in the drawing is described. The air-fuel ratio is controlled to the value significantly leaner than stoichiometric (for example A/F=20) by lean burn operation. At this time, NOx discharged from the engine is trapped by the NOx catalyst 16, and the NOx counter value X increases gradually. When the amount of adsorbed NOx reaches the predetermined amount, in other words, when the NOx counter value X reaches the predetermined value Xs, a rich spike is executed, and the air-fuel ratio is controlled to the value richer than stoichiometric (for example, A/F=11). The shaded portions in the drawing where the air-fuel ratio is rich, is equivalent to the reducing agent amount I that is supplied by rich spike. The predetermined amount of NOx stored in the NOx catalyst 16 may be the saturation amount of the NOx catalyst 16, or may be less than the saturation amount.

For simplicity, it is assumed that the air-fuel ratio during lean control is set as a significantly lean value and NOx discharged from the engine is not reduced by the three-way catalyst 11 but is instead stored in the NOx catalyst 16. However, if the amount of NOx stored in the NOx catalyst 16 needs to be more precisely estimated, a predetermined proportion of the NOx amount discharged from the engine may be estimated as the amount of adsorbed NOx, considering a NOx reduction rate of the three-way catalyst 11 in relation to an air-fuel ratio. Likewise, all amounts of reducing agent are assumed to be supplied to the NOx catalyst 16 during rich spike. If the amount of reducing agent supply needs to be estimated more precisely, a predetermined proportion of the reducing agent amount discharged from the engine may be estimated as the amount of reducing agent supplied to the NOx catalyst 16, considering HC and CO purification rate of the three-way catalyst 11 in relation to the air-fuel ratio.

With respect to the reference symbol (I) in the drawing, the amount of reducing agent amount supplied to the NOx catalyst 16 through a rich spike is an amount that is just sufficient to reduce the amount of stored NOx. The amount of reduction agent sufficient to reduce the amount of stored NOx may be empirically determined and stored in the ECU 20. In this case, ammonia caused by excess reducing agents is not discharged to the NOx catalyst downstream side. Therefore, as shown in the drawing, output of the NOx sensor 18 hardly changes and stays around zero.

The NOx sensor output value N is integrated at predetermined intervals over a predetermined time period where output-changes of the NOx sensor 18 caused by excess reducing agents are sufficiently obtained, that is during the time period between the predetermined time ta and tb. In the case of (I), the integrated value approaches zero. An integration starting time ta may be set, for example, to coincide with the rich spike starting time, and an integration ending time tb may be set to lag the rich spike ending time by a predetermined period.

The NOx counter value X is initialized when rich spike ends and lean burn operation is resumed, and the counting starts again from zero.

Next, with respect to the reference symbol (II) in the drawing, in relation to the same amount of stored NOx in the NOx catalyst (NOx counter value Xs), a reducing agent amount during rich spike is set as an excess amount, that is greater than the required amount of the case (1) by a predetermined amount. The excess reducing agent amount is indicated by the reference symbol ΔI in FIG. 2B. In the present embodiment, the excess reducing agent is supplied through a single or one time rich spike.

Accordingly, the output of the NOx sensor 18 is increased by ammonia caused by the excess reducing agents that are discharged downstream of the Nox catalyst, and the NOx sensor output integrated value indicates a certain positive value. Normal operation or malfunction of the NOx sensor 18 may be determined by comparing the resulting NOx sensor output integrated value with a predetermined malfunction determination value. That is, NOx sensor output behavior when the known amount of excess reducing agent is supplied, is obtained in advance through experiments and the like therefore, it may be determined that the NOx sensor is malfunctioning if actual output behavior differs greatly from the anticipated output behavior.

Figure 2C:
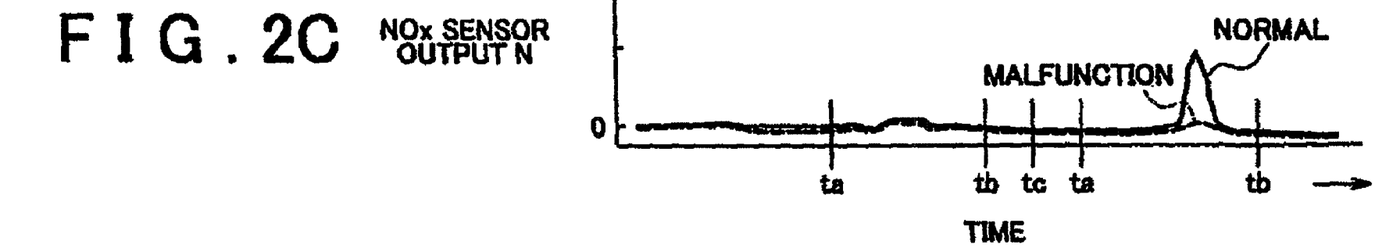

In FIG. 2C, the solid line indicates normal operation, which shows a moderate output change when the excess amount of reducing agent is supplied. In comparison, the broken line indicates the case of output decrease malfunction, in which the output from the NOx sensor is lower than when it operates normally.

If the NOx sensor output integrated value SN is greater than the maximum output threshold value SNmax, it is determined that the NOx sensor 18 has an output increase malfunction, in which the output from the NOx sensor is larger than when it operates normally. If the NOx sensor output integrated value SN is less than the minimum output threshold value SNmin, it is determined that the NOx sensor 18 has an output decrease malfunction (in the case of broken line in FIG. 2C). If the NOx sensor output value Nc during the period in which Nox sensor output should be zero, (for example, tc in FIG. 2C) is higher than the threshold value Ncs, which is greater than zero, it is determined that the NOx sensor 18 has a drift malfunction, in which zero as a reference value is largely deviated.

In reality, during lean control, oxygen is also adsorbed by the NOx catalyst 16 together with NOx. During rich spike, reducing agents are used to reduce NOx and oxygen from the NOx catalyst 16. However, such oxygen may be considered as part of NOx. Therefore, oxygen is treated in this way in the present embodiment.

Figure 3:
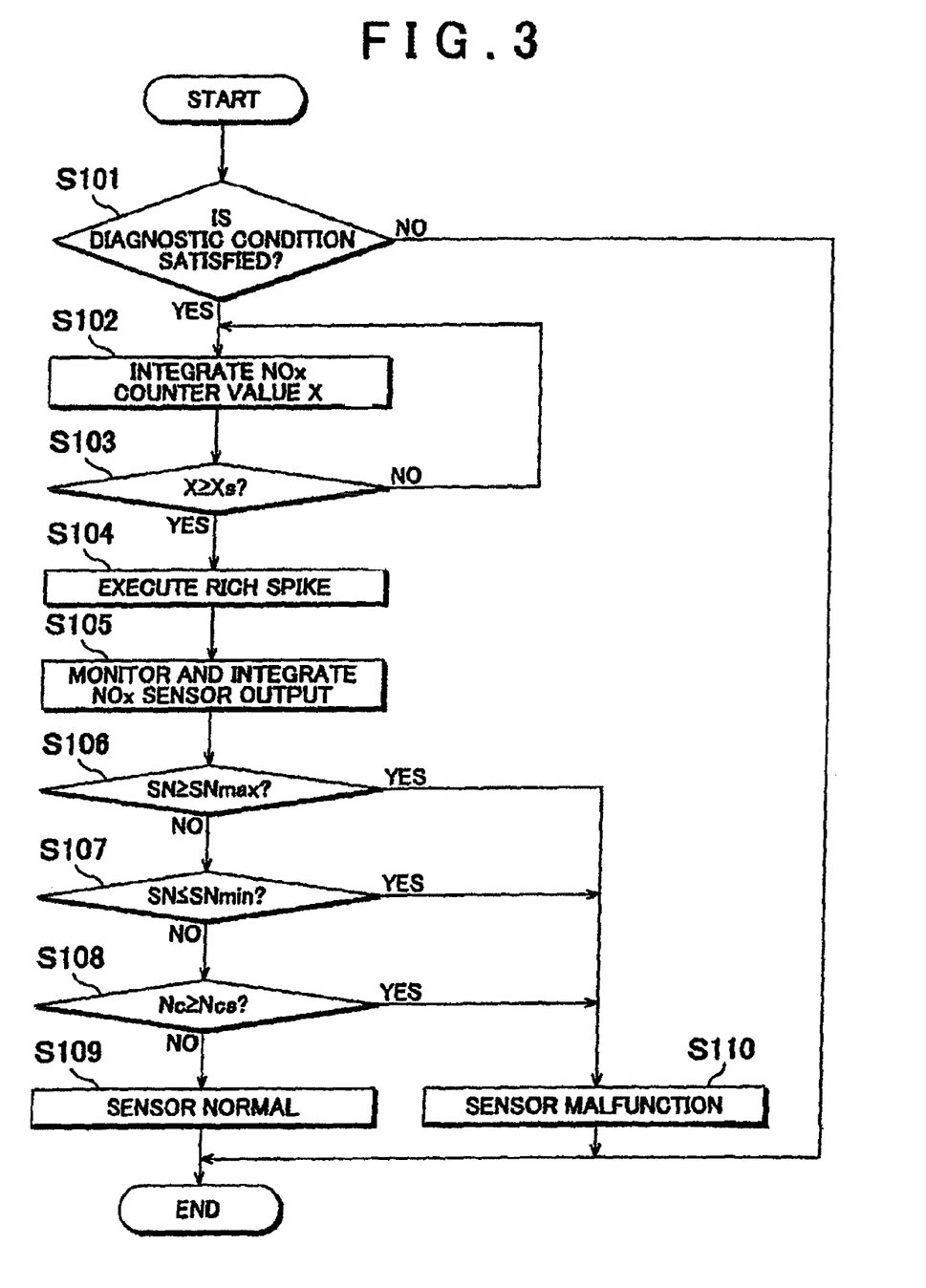
FIG. 3 is a flow chart illustrating the operations of the first aspect of malfunction diagnostic method.

Below, the operations according to the first embodiment of NOx sensor malfunction diagnostic process is described with reference to FIG. 3. The ECU 20 executes the operations shown in the drawing. As a precondition, lean burn operation as described above is performed except the time for rich spike.

In the first step S101, it is determined whether the predetermined diagnostic conditions necessary for malfunction diagnosis are satisfied. For example, diagnostic conditions are satisfied when an temperature of the NOx sensor 18 reaches a predetermined minimum activation temperature (for example, approximately 750° C.) or more and the NOx catalyst 16 is in the predetermined operation temperature range (for example, 280 to 550° C.).

If the conditions are not satisfied, the operation ends immediately. On the other hand, if conditions are satisfied, the operation proceeds to step S102, and the amount of adsorbed NOx is estimated, that is, integration of NOx counter value X is executed.

Next, in step S103, the NOx counter value X is compared with the predetermined value Xs. If the NOx counter value X is less than the predetermined value Xs, integration in step S102 is continued. If the NOx counter value X equals or exceeds the predetermined value Xs (substantially, when the NOx counter value X becomes equivalent to the predetermined value Xs), the operation proceeds to step S104, and single rich spike is executed to supply the excess amount of reducing agent.

In step S105, the output value N of the NOx sensor 18 at predetermined intervals is monitored, and at the same time, the output value N is integrated for a predetermined time period (from ta to tb). Once monitoring and integration ends, the NOx sensor output integrated value SN is compared to the predetermined maximum output threshold value SNmax in step S106. If the NOx sensor output integrated value SN equals or exceeds the maximum output threshold value SNmax, the operation proceeds to step S110, and it is determined that the NOx sensor is malfunctioning, specifically as output increase malfunction. On the other hand, if the NOx sensor output integrated value SN is less than the maximum sensor output threshold value SNmax, the process proceeds to step S107.

In step S107, the NOx sensor output integrated value SN is compared to the minimum output threshold value SNmin. If the NOx sensor output integrated value SN is equal to or below the minimum output threshold value SNmin, the operation proceeds to step S110, and it is determined that the NOx sensor 18 is malfunctioning, specifically as output decrease malfunction. On the other hand, if the NOx sensor output integrated value SN is greater than the minimum output threshold value SNmin, the operation proceeds to step S108.

In step S108, NOx sensor output Nc at the time period tc, where NOx sensor output is intended to be zero, is compared to the predetermined value Ncs that is greater than zero. If NOx sensor output Nc is the predetermined value Ncs or more, the process proceeds to step S110, and it is determined that the NOx sensor is malfunctioning, specifically as drift malfunction. On the other hand, if the NOx sensor output Nc is below the predetermined value Ncs, the operation proceeds to step S109, and it is determined that the NOx sensor 18 is operating normally.

Figures 4A, 4B, 4C:
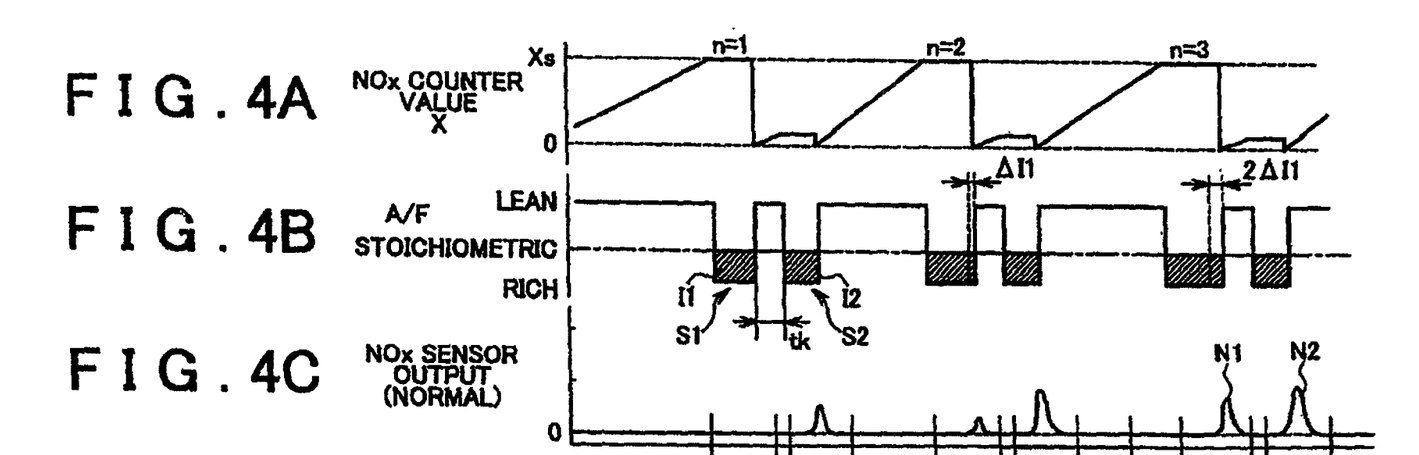
FIG. 4 is a time chart of the second aspect of malfunction diagnostic method.
Figure 4D:
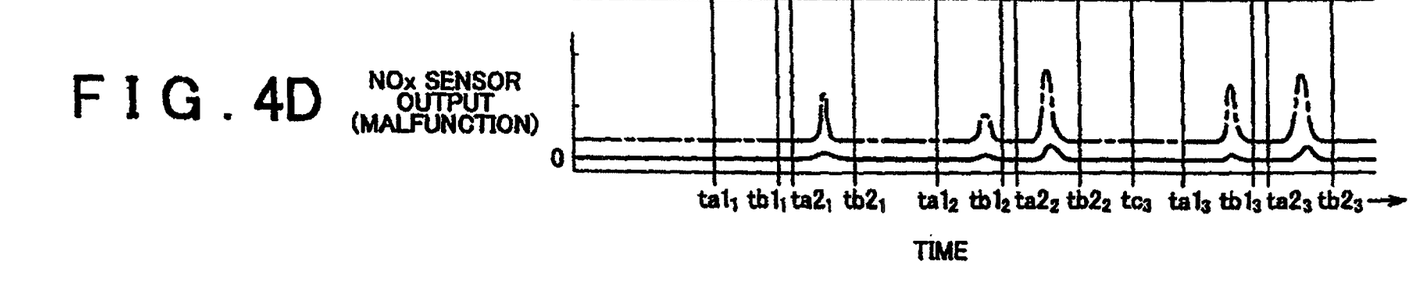

Next, the second embodiment of NOx sensor malfunction diagnostic process will be described with reference to FIGS. 4A-4D. Detailed description is not repeated for parts in common with the first embodiment. FIG. 4A and FIG. 4B each shows the NOx counter value X and the exhaust gas air-fuel ratio A/F that are same as the description above. FIG. 4C and FIG. 4D show NOx sensor output that is same as the description above. FIG. 4C shows the case of a sensor operating normally. FIG. 4D shows the case of a malfunctioning sensor. In FIG. 4D, the case of output increase malfunction is indicated by the long and short dashed line, and the case of output decrease malfunction is indicated by the solid line.

As shown in FIG. 4B, in the second embodiment, the excess amount reducing agent is supplied through a double rich spike, which is a rich spike that performed twice in succession. In the double rich spike, the rich spike performed first is called first spike, and the rich spike performed second is called second spike, and they are respectively indicated by S1, and S2. An extremely short idle period tk (for example 1 to 2 seconds) is set between the first spike and the second spike. In the drawing, the storage and regeneration process, NOx storage to the NOx catalyst 16 is paired with the NOx catalyst regeneration by double rich spike and is performed three times (n=1, 2, 3).

In the first iteration of the catalyst regeneration process (n=1), NOx is adsorbed by the NOx catalyst 16 during lean burn operation, and the NOx counter value X gradually increases. Once the amount of stored NOx reaches the predetermined amount, in other words when the NOx counter value X reaches the predetermined value Xs, a double rich spike, specifically, the first spike S1 is executed. The amount of reducing agent supplied through the first spike in the first catalyst regeneration process is set slightly less than the amount necessary to reduce all the stored NOx. Thus, because an excess amount of reducing agent is not supplied, ammonia that caused by excessive reducing agents is not discharged. Thus, output of the NOx sensor 18 is maintained at zero level.

When the first spike ends, the second spike S2 is executed after the idle period tk. Because lean burn is executed during the idle period tk, NOx is slightly stored during the period tk, and accordingly, the NOx counter value X increases. However, because the idle period tk is very short, the amount of additional NOx adsorbed is not significant. Thus, in the present embodiment, the additional NOx that is adsorbed during the idle period tk may be ignored.

At the start point of the second spike S2, some NOx remain in the NOx catalyst 16. An excess of reducing agent for reducing the remaining adsorbed NOx is supplied through the second spike. Accordingly, ammonia caused by the excess reducing agents is detected by the NOx sensor 18, and the output of the NOx sensor 18 increases. The normal operation and malfunction of the NOx sensor 18 may be determined as above by monitoring the output behavior of the NOx sensor 18.

In the second iteration of the catalyst regeneration process (n=2), in the first spike S1 performed when a stored-NOx amount reaches the predetermined amount, an excess amount of reducing agent $\Delta I1$ in addition to the amount supplied through the first spike, is supplied. In other words, if a reducing agent amount supplied by the first spike in the first catalyst regeneration process and second catalyst regeneration process are assumed to be $I1_1$, $I1_2$ respectively, the relationship is $I1_1 < I1_2$. In this way, a reducing agent amount supplied through the first spike is increased by the predetermined amount $\Delta I1$ every time the catalyst regeneration process is performed.

In the drawing, the reducing agent supply amount $I1_2$ in the first spike of the second catalyst regeneration process is in excess of the amount needed to reduce all the stored NOx. Therefore, ammonia is discharged as a result of the excess amount reducing agent supplied. Accordingly, the NOx sensor output value is slightly increased. If the reducing agent amount or excess reducing agent amount $\Delta I1$ in the first strike of the first catalyst regeneration process is set lower, reducing agent amount may not be excess even by the first spike of the second catalyst regeneration process. However, by at least the first spike of the third catalyst regeneration process, it should be possible to supply an excess amount of reducing agent.

Next, the second spike S2 is executed. In the second spike, a same amount of reducing agent as in the second spike of the first catalyst regeneration process is supplied. In other words, if a reducing agent amount supplied by the second spike of the first catalyst regeneration process and second catalyst regeneration process are assumed to be $I2_1$, $I2_2$ respectively, the relationship is $I2_1 = I2_2$. In this way, the amount of reducing agent supplied by the second spike is constant through every time of the catalyst regeneration process.

At the starting point of the second spike S2, there is no stored-NOx remained in the NOx catalyst 16. The entire amount of the reducing agent supplied through the second spike is used to generate ammonia, which is then detected by the NOx sensor 18. Accordingly, the output from the NOx sensor 18 should increase.

In the third iteration (N=3) of the catalyst regeneration process (N=3), the first spike S1 supplies an excess amount of reducing agent $\Delta I1$ in addition to the amount supplied through the first spike of the second iteration of the catalyst regeneration process. Specifically, the excess amount supplied would be $2\Delta I1$ more than reducing agents of the first spike of the first iteration of the catalyst regeneration process. A reducing agent amount that is in excess of the amount needed to reduce all the stored NOx becomes greater than that of the first spike of the second catalyst regeneration process. The increase in output from the NOx sensor should be higher than the increase in the first spike of the second iteration of the catalyst regeneration process.

Accordingly, when the same amount of reducing agent is supplied through the second spike S2 in the third iteration as in the second spike S2 of the second catalyst regeneration process, and the entire amount of reducing agent supplied is substantially used to form ammonia. The ammonia is then detected by the NOx sensor 18. That is, in the second spike of the second catalyst regeneration process and in the second spike of the third catalyst regeneration process, ammonia, which is corresponding to the same amount of reducing agent, is detected by the NOx sensor 18. The sensor output behavior of both, which is the sensor output integrated value of both, become the same.

In this way, at the point where the NOx sensor output behavior (specifically, sensor output integrated values) of the previous time (second time) and the latest time (third time) become the same in relation to the second spike, abnormality of the NOx sensor may be diagnosed based on the NOx sensor output behavior during the second spike of the latest iteration of the catalyst regeneration process. NOx sensor output integrated values are used here as NOx sensor output behavior; alternatively, the NOx sensor output peak value may be used, for example.

Figure 5:
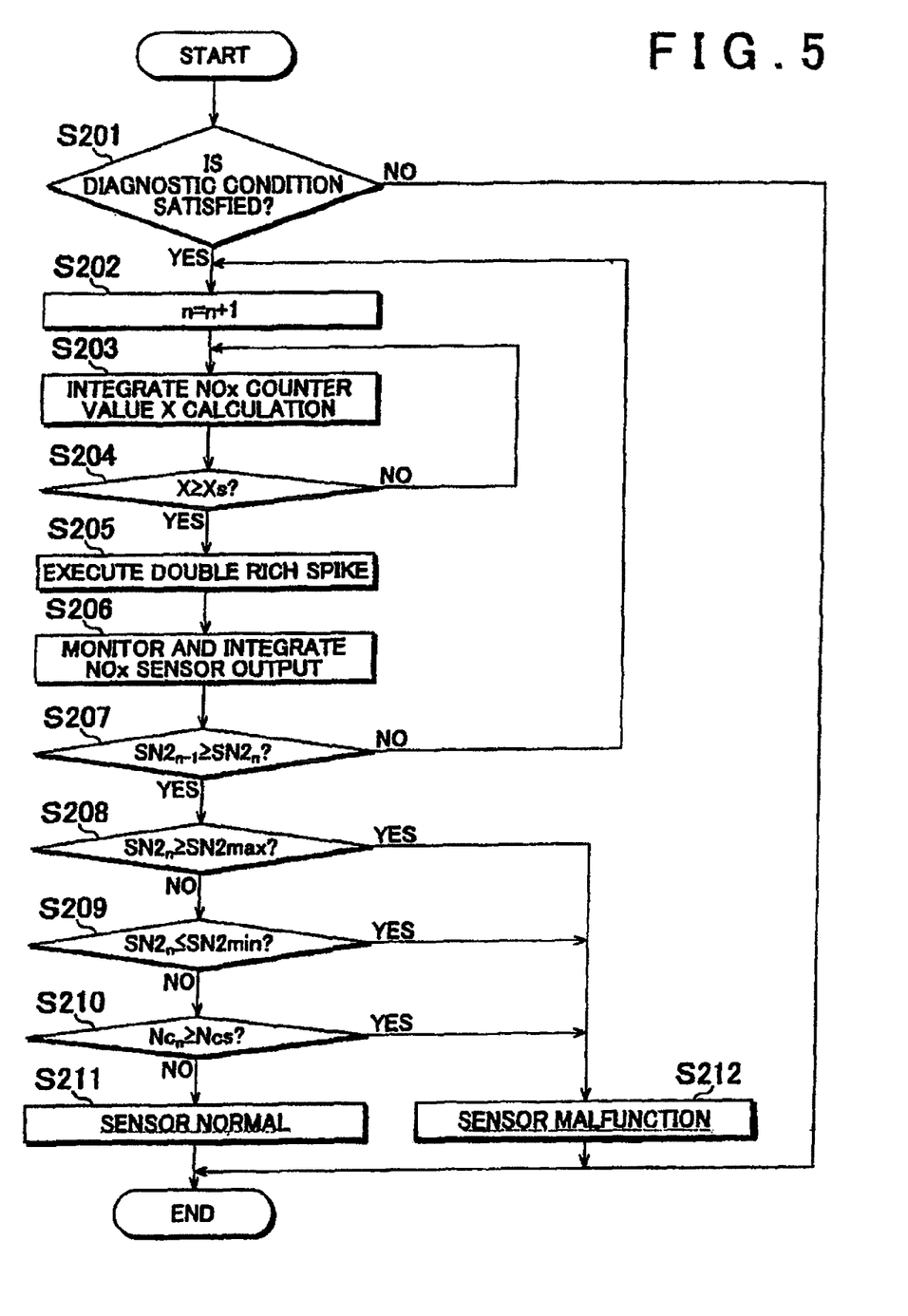
FIG. 5 is a flow chart illustrating the operations of the second aspect of malfunction diagnostic method.

Hereinafter, the operation according to the second embodiment of NOx sensor malfunction diagnostic method is described with reference to FIG. 5. Operations shown in the drawing are executed by the ECU 20. As a precondition, lean burn operation as described above is performed except for the rich spike.

In the first step S201, in the same way as step S101, it is determined whether the predetermined conditions necessary for malfunction diagnosis are satisfied. If the conditions are not satisfied, the process ends immediately. On the other hand, if the conditions are satisfied, the operation proceeds to step S202, the counter that counts the catalyst regeneration process number n adds 1. The initiation value of n is zero. In the first time process, it is n=1.

Next in step S203, the amount of adsorbed NOx is estimated, that is, integration of the NOx counter value X is executed. And, in step S204, the NOx counter value X is compared with the predetermined value Xs. If the NOx counter value X is less than the predetermined value Xs, integration in step S203 is continued. If the NOx counter value X is equal to or exceeds the predetermined value Xs, the operation proceeds to step S205, and the double rich spike, which is described above, is executed.

In step S206, the output value N of the NOx sensor 18 is monitored at predetermined intervals. At the same time, the output value N is integrated for a predetermined time period. As shown in FIG. 4, the NOx sensor output value N1 during the first spike is integrated for a predetermined time period (from $ta1_n$ to $tb1_n$), and at the same time, the NOx sensor output value N2 during the second spike is integrated for a predetermined time period (from $ta2_n$ to $tb2_n$). These integration time periods are individually set to the length such that the NOx sensor output behavior by the excess reducing agents can be determined well.

When monitoring and integration ends, the operation proceeds to step S207, in which it is determined whether the NOx sensor output integrated value $SN2_n$ during the second spike of the latest time is equal to or below the NOx sensor output integrated value $SN2_{n-1}$ during the second spike of the previous time ($SN2_{n-1} \geq SN2_n$). However, $SN2_{n-1} > SN2_n$ is not a realistic relation. So, it is substantially determined whether $SN2_{n-1} = SN2_n$.

If $SN2_{n-1} \geq SN2_n$ is not established, that is, if $SN2_{n-1} = SN2_n$ is not substantially established, the operation proceeds to step S202, and steps S202 to 206 are repeatedly executed. That is, each time the catalyst regeneration process number n is increased by 1, NOx is adsorbed repeatedly until the NOx counter value X reaches the predetermined value Xs. After this, double rich spike is executed. In the double rich spike, a reducing agent amount of the first spike is increased by the predetermined amount ΔI compared to the previous time, and a reducing agent amount of the second spike is set equal to the previous time. Then, the NOx sensor output integrated values $SN1_n$, $SN2_n$ during the first spike and the second spike are integrated.

In step S207, if $SN2_{n-1} \geqq SN2_n$ is established, that is, if $SN2_{n-1} = SN2_n$ is substantially established, the NOx sensor output integrated value $SN2_n$ during the second spike of the latest time should be a value when the certain amount of reducing agent 12 is supplied by the second spike. Therefore, based on the NOx sensor output integrated value $SN2_n$ during the second spike, malfunctions of the NOx sensor are determined in the following way.

First, in the step S208, the NOx sensor output integrated value $SN2_n$ is compared with the upper limit threshold SN2max. If the NOx sensor output integrated value SN2n equals or exceeds SN2max, the operation proceeds to the step S212, and it is determined that the NOx sensor 18 is malfunctioning, specifically as output increase malfunction. However, if the NOx sensor output integrated value $SN2_n$ is less than the upper limit threshold SN2max, the operation proceeds to the step S209.

In the step S209, the NOx sensor output integrated value $SN2_n$ is compared to the lower limit threshold SN2min. If the NOx sensor output integrated value $SN2_n$ is equal to or below the lower limit threshold SN2min, the operation proceeds to the step S212, and it is determined that the NOx sensor 18 is malfunctioning, specifically as output decrease malfunction. However, if the NOx sensor output integrated value $SN2_n$ is greater than the lower limit threshold SN2min, the operation proceeds to the step S210.

In step S210, NOx sensor output $Nc_n$ at the predetermined time period $tc_n$, in which NOx sensor output is supposed to be zero, is compared to the predetermined value Ncs that is greater than zero. For example, as shown in FIG. 4, the predetermined time period $tc_n$ ($tc_3$) is set any time period between the integration ending time period $tb2_{n-1}$ ($tb2_2$) of the second spike of the previous time and the integration start time period $ta1_n$ ($ta1_3$) of the first spike of the latest time. If the NOx sensor output $Nc_n$ equals or exceeds the predetermined value Ncs, the operation proceeds to step S212, and it is determined that the NOx sensor 18 is malfunctioning, in particular as a drift malfunction. On the other hand, if the NOx sensor output $Nc_n$ is less than the predetermined value Ncs, the operation proceeds to step S211, and it is determined that the NOx sensor 18 is operating normally.

As described above, according to the present embodiment, malfunctions of the NOx sensor is diagnosed based on NOx sensor output in relation to the known excess reducing agent amount after all stored-NOx is released by the NOx catalyst 16 located upstream side of the NOx sensor. In spite of deterioration and the like of the NOx catalyst 16, malfunction diagnosis of the NOx sensor 18 may be executed without being affected by the NOx catalyst 16. Therefore, preferable and highly precise abnormality diagnosis can be executed. Furthermore, malfunctions of the NOx sensor may be accurately diagnosed separately from malfunctions of the NOx catalyst.

The above described embodiments of the present invention are may also be modified as necessary. For example, in the above embodiment, the amount of NOx adsorbed by the NOx catalyst is estimated based on the engine operation state. Alternatively, a second NOx sensor may be used to detect the NOx concentration of the exhaust gas flowing into the NOx catalyst, and the amount of NOx adsorbed by the NOx catalyst may be estimated based on the detected NOx concentration.

Embodiments of the present invention are not limited to the described embodiments, and include various modifications, applications, and equivalents that fall within the scope of the present invention as defined by the appended claims. Thus, the present invention should not be interpreted restrictively, and may be applied to any other technology that falls within the scope of the present invention.

The invention claimed is:

1. An NOx sensor malfunction diagnostic device for an internal combustion engine in which a storage reduction type NOx catalyst is disposed in an exhaust passage, and an NOx sensor is provided downstream of the NOx catalyst, the NOx sensor malfunction diagnostic device comprising:
a control section that performs the supplying of an excess amount of reducing agent to the NOx catalyst in addition to the amount required to reduce a predetermined amount of adsorbed NOx when the NOx catalyst has adsorbed a predetermined amount of NOx and that diagnoses malfunctions of the NOx sensor based on output of the NOx sensor when the excess amount of reducing agent is supplied,
wherein the control section supplies the excess reducing agent through a double rich spike.

2. The NOx sensor malfunction diagnostic device according to claim 1, wherein:
the control section determines that the NOx sensor is malfunctioning if an output value of the NOx sensor when the excess reducing agent is supplied equals or exceeds a maximum output threshold, or is below a minimum output threshold.

3. The NOx sensor malfunction diagnostic device according to claim 1, wherein:
the control section determines that the NOx sensor is malfunctioning if the output value of the NOx sensor when the excess reducing agent is not supplied equals or exceeds a predetermined value.

4. The NOx sensor malfunction diagnostic device according to claim 1, wherein:
the control section supplies the excess reducing agent through a single rich spike.

5. The NOx sensor malfunction diagnostic device according to claim 1, wherein:
the control section diagnoses malfunctions of the NOx sensor based on the output value of the NOx sensor during a second spike of the double rich spike.

6. The NOx sensor malfunction diagnostic device according to claim 5, wherein:
the control section performs a plurality of double rich spikes while gradually increasing an amount of the reducing agent supplied in a first spike and maintaining the amount of the reducing agent supplied in the second spike at a constant amount; and
diagnoses malfunction of the NOx sensor based on NOx sensor output behavior during the second spike of present time, at the time when the NOx sensor output behavior during the second spike becomes equal between the present time and previous time.

7. The NOx sensor malfunction diagnostic device according to claim 6, wherein:
the control section set the amount of the reducing agent in the first spike of the first double rich spike to an amount below the amount required to reduce all of the adsorbed NOx.

8. The NOx sensor malfunction diagnostic device according to claim 1, wherein:
the NOx sensor detects NOx and ammonia in an exhaust gas.

9. An NOx sensor malfunction diagnostic method for an internal combustion engine, in which a storage reduction type NOx catalyst is disposed in an exhaust passage and an NOx sensor is provided downstream of the NOx catalyst, the NOx sensor malfunction diagnostic method comprising:
supplying an excess amount of reducing agent in addition to the amount required to reduce a predetermined amount of adsorbed NOx when the NOx catalyst has adsorbed a predetermined amount of NOx; and
diagnosing a malfunction of the NOx sensor based on output of the NOx sensor when the excess amount of reducing agent is supplied,
wherein the control section supplies the excess reducing agent through a double rich spike.

* * * * *